(12) United States Patent
Cano et al.

(10) Patent No.: US 8,092,017 B2
(45) Date of Patent: Jan. 10, 2012

(54) METHOD FOR PRODUCING AN OPHTHALMIC LENS AND AN OPTICAL COMPONENT FOR CARRYING OUT SAID METHOD

(75) Inventors: Jean-Jaul Cano, Charenton-le-Pont (FR); Paul Coudray, Montpellier (FR)

(73) Assignee: Essilor International (Compangie Generale d'optique), Charenton le Pont (FR)

( * ) Notice: Subject to any disclaimer, the term of this patent is extended or adjusted under 35 U.S.C. 154(b) by 406 days.

(21) Appl. No.: 11/571,324

(22) PCT Filed: Jun. 28, 2005

(86) PCT No.: PCT/FR2005/001635
§ 371 (c)(1),
(2), (4) Date: Dec. 27, 2006

(87) PCT Pub. No.: WO2006/013252
PCT Pub. Date: Feb. 9, 2006

(65) Prior Publication Data
US 2007/0247588 A1 Oct. 25, 2007

(30) Foreign Application Priority Data
Jul. 2, 2004 (FR) ..................................... 04 07388

(51) Int. Cl.
*G02C 7/02* (2006.01)
*G02C 7/06* (2006.01)
(52) U.S. Cl. ......... 351/177; 351/159; 351/168; 351/176
(58) Field of Classification Search .............. 351/41, 351/159, 163, 165–167, 176–177; 359/652–655, 359/618–622, 294–296; 349/13, 14, 155–156
See application file for complete search history.

(56) References Cited

U.S. PATENT DOCUMENTS

| | | | |
|---|---|---|---|
| 2,196,066 A | 4/1940 | Feinbloom |
| 2,511,329 A | 6/1950 | Craig |
| 3,460,960 A | 8/1969 | Francel et al. |
| 3,532,038 A | 10/1970 | Rottmann et al. |
| 3,628,854 A | 12/1971 | Jampolsky |

(Continued)

FOREIGN PATENT DOCUMENTS
AU 779628 2/2005
(Continued)

OTHER PUBLICATIONS

Cognard, Philippe. "Colles et adhesifs pour emballages, Generalities," 18 pages (English Summary Provided), Nov. 10, 2001.

(Continued)

*Primary Examiner* — Ricky Mack
*Assistant Examiner* — Zachary Wilkes
(74) *Attorney, Agent, or Firm* — Occhiuti Rohlicek & Tsao LLP

(57) ABSTRACT

The invention relates to a method for producing an ophthalmic lens exhibiting optical function coexisting in producing an optical component (10) incorporating at least one type of active material (2) which is distributed in a parallel direction to the surface thereof. Said active material exhibits a radiation-modifiable optical property. The active material (5) portions disposed through the component (10) surface are, afterwards, selectively irradiated in such a way that the optical function is obtainable by modulating said property from one portion to another one, wherein the sizes of said portions are less than 1 mm.

26 Claims, 2 Drawing Sheets

U.S. PATENT DOCUMENTS

| | | | |
|---|---|---|---|
| 3,978,580 A | 9/1976 | Leupp et al. | |
| 4,150,878 A | 4/1979 | Barzilai et al. | |
| 4,268,132 A | 5/1981 | Neefe | |
| 4,601,545 A | 7/1986 | Kern | |
| 4,621,912 A | 11/1986 | Meyer | |
| 4,720,173 A | 1/1988 | Okada et al. | |
| 4,791,417 A | 12/1988 | Bobak | |
| 4,994,664 A | 2/1991 | Veldkamp | |
| 5,017,000 A | 5/1991 | Cohen | |
| 5,044,742 A | 9/1991 | Cohen | |
| 5,067,795 A | 11/1991 | Senatore | |
| 5,139,707 A | 8/1992 | Guglielmetti et al. | |
| 5,233,038 A | 8/1993 | Guglielmetti et al. | |
| 5,359,444 A * | 10/1994 | Piosenka et al. | 349/13 |
| 5,529,725 A | 6/1996 | Guglielmetti et al. | |
| 5,576,870 A | 11/1996 | Ohmae et al. | |
| 5,585,968 A * | 12/1996 | Guhman et al. | 359/654 |
| 5,604,280 A | 2/1997 | Pozzo et al. | |
| 5,699,142 A | 12/1997 | Lee et al. | |
| 5,733,077 A | 3/1998 | MacIntosh | |
| 5,763,054 A | 6/1998 | Samec et al. | |
| 5,764,333 A | 6/1998 | Somsel | |
| 5,774,273 A | 6/1998 | Bornhorst | |
| 5,805,263 A | 9/1998 | Reymondet et al. | |
| 5,807,906 A | 9/1998 | Bonvallot et al. | |
| 5,812,235 A | 9/1998 | Seidner et al. | |
| 5,905,561 A | 5/1999 | Lee et al. | |
| 5,914,802 A | 6/1999 | Stappaerts et al. | |
| 6,019,914 A | 2/2000 | Lokshin et al. | |
| 6,118,510 A | 9/2000 | Bradshaw et al. | |
| 6,199,986 B1 * | 3/2001 | Williams et al. | 351/221 |
| 6,259,501 B1 | 7/2001 | Yaniv | |
| 6,274,288 B1 | 8/2001 | Kewitsch et al. | |
| 6,281,366 B1 | 8/2001 | Frigoli et al. | |
| 6,301,051 B1 | 10/2001 | Sankur | |
| 6,307,243 B1 | 10/2001 | Rhodes | |
| 6,309,803 B1 | 10/2001 | Coudray et al. | |
| 6,327,072 B1 | 12/2001 | Comiskey et al. | |
| 6,449,099 B2 | 9/2002 | Fujimoto et al. | |
| 6,485,599 B1 | 11/2002 | Glownia et al. | |
| 6,577,434 B2 | 6/2003 | Hamada | |
| 6,597,340 B1 | 7/2003 | Kawai | |
| 6,707,516 B1 | 3/2004 | Johnson et al. | |
| 6,712,466 B2 | 3/2004 | Dreher | |
| 6,871,951 B2 | 3/2005 | Blum et al. | |
| 6,934,088 B2 | 8/2005 | Lai et al. | |
| 6,963,435 B2 | 11/2005 | Mallya et al. | |
| 6,987,605 B2 | 1/2006 | Liang et al. | |
| 7,036,929 B1 | 5/2006 | Harvey | |
| 7,144,529 B1 | 12/2006 | Mercier | |
| 7,227,692 B2 | 6/2007 | Li et al. | |
| 7,289,260 B2 * | 10/2007 | Kaufman et al. | 351/161 |
| 7,404,637 B2 | 7/2008 | Miller et al. | |
| 7,533,453 B2 | 5/2009 | Yancy | |
| 7,715,107 B2 | 5/2010 | Loopstra et al. | |
| 2002/0008898 A1 | 1/2002 | Katase | |
| 2002/0016629 A1 | 2/2002 | Sandstedt et al. | |
| 2002/0080464 A1 * | 6/2002 | Bruns | 359/290 |
| 2002/0114054 A1 | 8/2002 | Rietjens | |
| 2002/0140899 A1 | 10/2002 | Blum et al. | |
| 2002/0145797 A1 | 10/2002 | Sales et al. | |
| 2002/0167638 A1 | 11/2002 | Byun et al. | |
| 2002/0176963 A1 | 11/2002 | Chen et al. | |
| 2003/0003295 A1 * | 1/2003 | Dreher et al. | 351/159 |
| 2003/0021005 A1 | 1/2003 | Liang et al. | |
| 2003/0035199 A1 | 2/2003 | Liang et al. | |
| 2003/0081172 A1 * | 5/2003 | Dreher | 351/176 |
| 2003/0085906 A1 | 5/2003 | Elliott et al. | |
| 2003/0143391 A1 * | 7/2003 | Lai | 359/290 |
| 2003/0147046 A1 | 8/2003 | Shadduck | |
| 2003/0152849 A1 | 8/2003 | Chan-Park et al. | |
| 2003/0174385 A1 | 9/2003 | Liang et al. | |
| 2003/0206260 A1 | 11/2003 | Kobayshi et al. | |
| 2004/0008319 A1 | 1/2004 | Lai et al. | |
| 2004/0027327 A1 | 2/2004 | LeCain et al. | |
| 2004/0114111 A1 | 6/2004 | Watanabe | |
| 2004/0120667 A1 | 6/2004 | Aylward et al. | |
| 2004/0125247 A1 | 7/2004 | Seshan et al. | |
| 2004/0125337 A1 | 7/2004 | Boulineau et al. | |
| 2004/0165252 A1 | 8/2004 | Liang et al. | |
| 2004/0169932 A1 | 9/2004 | Esch et al. | |
| 2004/0190115 A1 | 9/2004 | Liang et al. | |
| 2004/0233381 A1 | 11/2004 | Kim et al. | |
| 2006/0006336 A1 | 1/2006 | Cano et al. | |
| 2006/0087614 A1 | 4/2006 | Shadduck | |
| 2006/0279848 A1 | 12/2006 | Kuiper et al. | |
| 2007/0152560 A1 | 7/2007 | Naito et al. | |
| 2008/0068723 A1 * | 3/2008 | Jethmalani et al. | 359/642 |
| 2008/0212018 A1 | 9/2008 | Ballet et al. | |
| 2008/0314499 A1 | 12/2008 | Begon et al. | |

FOREIGN PATENT DOCUMENTS

| | | |
|---|---|---|
| CA | 2340672 | 12/2000 |
| DE | 19714434 | 10/1998 |
| EP | 728572 | 8/1996 |
| EP | 1225458 | 7/2002 |
| EP | 1308770 | 5/2003 |
| FR | 2561005 | 9/1985 |
| FR | 2718447 | 10/1995 |
| FR | 2872589 | 1/2006 |
| WO | 00/77570 | 12/2000 |
| WO | 02/01281 | 1/2002 |
| WO | 02/065215 | 8/2002 |
| WO | 03/012542 | 2/2003 |
| WO | 03/077012 | 9/2003 |
| WO | 03/102673 | 12/2003 |
| WO | WO 2004/015481 | 2/2004 |
| WO | WO 2004/034095 | 4/2004 |
| WO | 2004/051354 | 6/2004 |
| WO | 2005/033782 | 4/2005 |
| WO | 2006/013250 | 2/2006 |
| WO | 2006/050366 | 5/2006 |
| WO | 2006/067309 | 6/2006 |
| WO | 2007/010414 | 1/2007 |
| WO | 2007/023383 | 3/2007 |
| WO | 2007/144308 | 12/2007 |

OTHER PUBLICATIONS

Fowles, Grant R. Introduction to Modern Optics. New York: Dover Publications, 1989. Print. pp. 138-139.
Hecht, Eugene, "Optics, $4^{th}$ Edition" 2002 Addison Wesley, p. 428 (XP002465206) (chapter 10 from $2^{nd}$ edition provided).
J-P. Perez, Optique: Fondements et Applications [Optics: Basics and Applications] $7^{th}$ edition, published by Dunod, Oct. 2004, p. 262.
Kaufman U.S. Appl. No. 60/507,940 Drawing Sheets 4, 5.
David R. Lide, ed., CRC Handbook of Chemistry and Physics, 89th edition (internet version 2009), CRC Press/Taylor and Francis, Boca Raton, FL, pp. 10-12 through 10-13.

* cited by examiner

METHOD FOR PRODUCING AN OPHTHALMIC LENS AND AN OPTICAL COMPONENT FOR CARRYING OUT SAID METHOD

CROSS-REFERENCE TO RELATED APPLICATIONS

This application is the US National Stage of International Application No. PCT/FR2005/001635, filed on Jun. 28, 2005, which claims the priority to French Patent Application Serial No. 04 07388, filed on Jul. 2, 2004. The contents of both applications are hereby incorporated by reference in their entireties.

FIELD OF THE INVENTION

The present invention relates to a method for producing an ophthalmic lens, and an optical component suitable for implementing said method.

BACKGROUND OF THE INVENTION

Ophthalmic lens here means any optical component made from mineral and/or organic material, at least partially transparent and suitable for being placed before a wearer's eye, regardless of the optical function of said component. It may in particular have an antiglare protective function by absorption of part of the light, called antisolar function, a contrast reinforcing function by coloration or by polarization filtering, an ametropia correcting function, etc. It may in particular be an afocal, unifocal, bifocal, multifocal or progressive lens.

Ametropia correcting lenses are conventionally produced by forming a transparent material with a refractive index higher than air. The shape of the lenses is selected so that the refraction at the interfaces between the material and the air causes appropriate focusing of the light on the wearer's retina. The lens is generally cut out to be fit into a frame, with an appropriate positioning with regard to the pupil of the corrected eye.

In certain distribution circuits, blanks of corrective lenses that are manufactured industrially are finished to adapt them to the ametropia of an eye to be corrected. The finish consists for example in machining and polishing the back of the blank. This method combines the industrial production of the blanks, thereby reducing their cost, and the need to personalize the correction. However, the reshaping of lenses according to the wear's needs requires specialized tools and skills. These must be available close to the place of distribution to satisfy the current desire for rapid delivery of the lenses. This creates a strong need for investment and organization.

In the case of optical functions other than ametropia correction, the personalization possibilities are highly restricted. The wearer is generally offered a choice among a small number of lens colors, degrees of light absorption, sometimes polarizations, which correspond to lens models or blanks available ex-works. It is conceivable to increase the number of possibilities offered, but this would be to the detriment of the unit production cost. The possibilities of varying an absorption or coloration parameter along the lens surface are even more limited, and in any case are not appropriate to the individual needs or desiderata of the wearers.

SUMMARY OF THE INVENTION

It is an object of the present invention to propose a method for producing ophthalmic lenses which offers great flexibility of adaptation to the individual cases of wearers.

For this purpose, the invention proposes a method for producing an ophthalmic lens having at least one optical function, comprising the following steps:

a) producing an optical component incorporating at least one active material distributed parallel to a surface of the component, the active material having an irradiation-modifiable optical property; and b) selectively irradiating portions of the active material along the component surface to obtain the optical function by modulating said property from one portion to another, said portions having dimensions smaller than 1 mm.

In the inventive method, step a) for producing the optical component may be independent of or slightly dependent on the quantitative aspects of the optical function of the lens. It is therefore common to the production of lenses of various types. The industrial facilities used for this step accordingly serve to produce a very large number of components, thus leading to reduce the unit cost of each component thereby produced.

Step b) serves to program the optical function of the lens. This programming is carried out by inscribing the optical function in the optical component, by irradiating portions of the active material. A differentiation is thereby obtained between the lenses, which serves to produce a line of diversified lenses, covering a wide range of degrees of completion of the optical function, and optionally, of optical functions of different types. In particular, the optical function of an ophthalmic lens obtained by the inventive method may comprise an antisolar effect and/or an ametropia correction.

Thanks to the invention, the customisation of the ophthalmic lenses is delayed in the progress of the lens production process. This causes more efficient manufacture and more economical inventory control. This is because step a) for producing the optical components can be carried out centrally in relatively large capacity industrial units and step b) of irradiation to program the optical function of each lens can be carried out by the distributor, according to the desiderata and/or the ametropia characteristics of each client. It is then sufficient for the distributor to have only a reserve stock of optical components of a single model or of a limited number of models, thereby simplifying his inventory control.

The inscription of the optical function is obtained by modulating the optical property between portions of active material whereof the dimensions parallel to the surface of the optical component are smaller than 1 mm. Each portion therefore constitutes a pixel to which a value of the optical property is attributed.

Thus, according to the invention, the optical function is brought to the lens in pixelized form. For this purpose, the optical function is defined according to variable levels of an optical property evaluated at pixels distributed in parallel to the surface of the optical component. Each pixel individually modifies the light incident on this pixel according to the corresponding level of the optical property set during the irradiation. The optical function of the lens thereby results from the combination of the elementary contributions of all the pixels with the modification of the light passing through the lens. Thanks to this pixelization of the optical function, the optical function can be inscribed in the lens rapidly, simply and accurately.

The high accuracy according to which the optical function can be defined in the irradiation step b) is a further advantage of the invention. In particular, an ametropia correction inscribed in the optical component according to the inventive method can be adapted exactly to the degree of ametropia to be corrected. This can eliminate the need for the subsequent finishing of the lens surfaces by mechanical means according to the degree of ametropia of a particular client.

The modifiable optical property of the active material may be of various types. To obtain a sunlens, the modifiable optical property may comprise a light absorption by the active material or a color thereof. Thus, a more or less dark or variable color lens can be obtained by using irradiation characteristics adapted for imparting the desired level of light absorption or the desired color to the active material.

The modifiable optical property may also comprise a refringence of the active material. A light wave passing through one of the portions of the active material is then phase-shifted according to the optical path corresponding to the passage through this portion. The optical path is equal to the product of the thickness of the portion of active material and its refractive index. By appropriately setting the refractive index in each portion of the active material during irradiation step b), the phase, and consequently the vergence of the light wave exiting the lens, can be adapted to obtain a predefined ametropia correction.

According to a preferred embodiment of the invention, the portions of the active material have dimensions of between 5 µm (microns) and 100 µm parallel to the surface of the lens component. The various pixels then cannot be discerned individually by the naked eye, and the lens has a continuous visual appearance. This produces an excellent visual comfort. Furthermore, no iridescence is perceptible, so that the lens raises no esthetic problems.

A method for producing an ophthalmic lens according to the invention may further comprise the following step, carried out after step b):

c) heating the optical component, to make the active material insensitive to another irradiation.

The state of the active material, as resulting from the irradiation of step b), is then definitively fixed during the heating. It can no longer be modified by another irradiation occurring during the use of the lens.

The invention also relates to an optical component for ophthalmic lens, incorporating at least one active material distributed parallel to a surface of the component, the active material having an irradiation-modifiable optical property for obtaining a modulation of said property between portions of the active material having dimensions smaller than 1 mm. The modifiable optical property may comprise a light absorption and/or a refringence of the active material.

Other features and advantages of the present invention will appear from the description below of several nonlimiting exemplary embodiments, with reference to the drawings appended hereto.

DETAILED DESCRIPTION OF THE PREFERRED EMBODIMENTS

Figure 1:
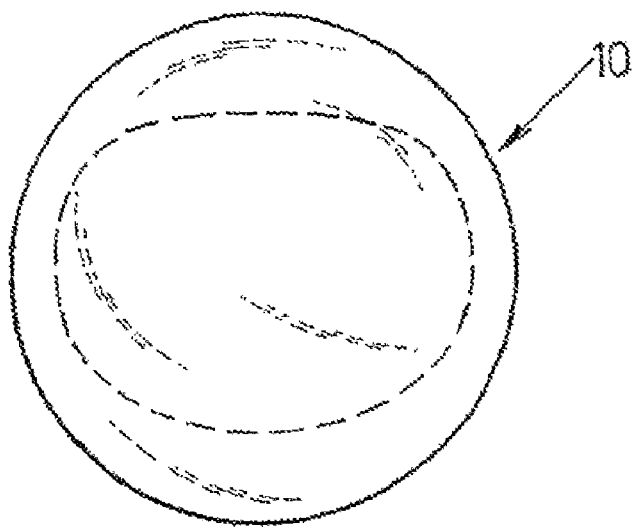
FIG. 1 shows an optical component suitable for implementing the invention.

The optical component 10 shown in FIG. 1 is a blank for spectacle lens. This blank may have a diameter of 6 cm, for example. In a manner known per se, the lens ready for assembly with a frame is obtained by trimming the blank 10 along a contour corresponding to the frame. This contour is shown by a dotted line in FIG. 1.

Figure 2A:
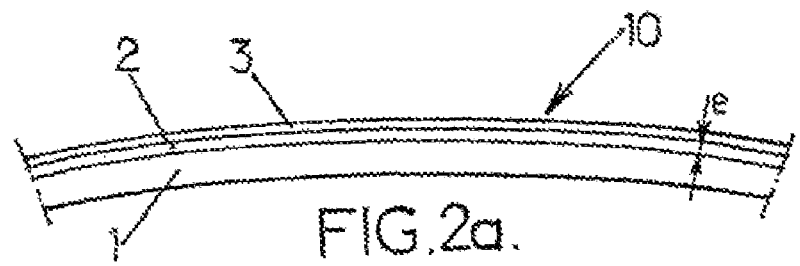
FIGS. 2a and 2b are respective cross sections of two optical components according to FIG. 1.
Figure 2B:
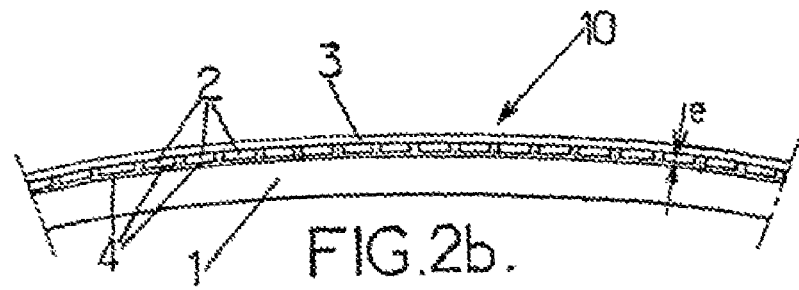

FIGS. 2a and 2b show two initial configurations of the optical component, which correspond to two different ways of defining the pixels of inscription of the optical function in the lens. In the case of a configuration according to FIG. 2a, the pixels are not defined in the optical component before the irradiation stage. Conversely, an optical component having a configuration according to FIG. 2b initially has pixels which are individually defined during the manufacture of the optical component, by their respective dimensions, their respective shape and their respective structure.

According to a first configuration of the optical component (FIG. 2a), the active material is distributed in a substantially continuous layer in at least part of the component. The lens 10 blank therefore consists of a substrate 1 of transparent mineral or organic material, covered on one of its faces with a continuous layer of active material 2. The layer of active material 2 may have a uniform thickness e over the whole face of the substrate 1. Optionally, the layer 2 may itself be covered with at least one coating 3. Such a coating 3 may in particular have an antireflecting coating, a hard coating to impart improved scratch resistance to the lens, or a water-repellent coating. The layer of active material 2 and the coating 3 may be applied to the substrate 1 by one of the methods known to a person skilled in the art.

According to the second configuration (FIG. 2b), the active material is distributed in portions 4 separated from one another and formed in at least part of the component. By way of example, the portions 4 are arranged on one of the faces of the substrate 1 which is of transparent material. They are adjacent to one another and form a mesh so as to cover the entire upper face of the substrate 1. The portions 4 can be formed directly in the substrate 1 or in a layer of additional material added onto the substrate 1. Each portion of active material 2 has a thickness e. A coating 3 may also be placed above the portions 4.

Preferably, in the various possible configurations of the optical component, the thickness e of the active material 2 is greater than 10 µm in the component. The optical function resulting from the modulation of the optical property of the active material 2 may thereby have a high amplitude. As an example, in the case of the modulation of the absorption coefficient of the active material 2, very dark lenses can be obtained. This is because the thickness of the absorbing active material is sufficient to obtain a considerable reduction of the light intensity, in a proportion of up to 90% of the incident light, for example. The inventive method therefore enables to produce sunlenses procuring effective protection.

Similarly, when the modulated optical property is the refringence of the active material, strong ametropia corrections can be obtained. This is because, since the variations in the optical path resulting from the modulation of the refractive index are proportional to the thickness of the active material, a thickness thereof of more than 10 µm enables to obtain wide variations of the optical path between various points of the lens surface.

The irradiation of the active material 2 to inscribe the optical function in the lens 10 blank can be carried out in various ways. In particular, it can be carried out by exposing the active material 2 to an appropriate beam through a mask. Such a mask has zones essentially transparent to the beam, zones that are partially transparent and/or opaque zones. By selecting the quantity of beam energy received by each portion of the active material 2, the optical property is fixed in this portion at a predefined level. The quantity of beam energy received by each portion may be varied by changing the power of the beam and/or the exposure time.

The beam used for irradiating the portions of active material may be of different types: a beam of electromagnetic radiation, in particular ultraviolet radiation, or an electron beam. Known irradiation source can be used, selected according to the type of beam. Moreover, during irradiation, all the portions of the active material 2 may be exposed simultaneously, or certain portions of the active material 2 can be irradiated successively.

Advantageously, the irradiation is controlled so that the optical property is modulated discretely according to a predefined set of values quantifying this property. Digital control of the irradiation can then be used, procuring great ease of programming. For the optical function of the lens to be definable very accurately, the predefined set of values preferably comprises at least then distinct values.

Figure 3:
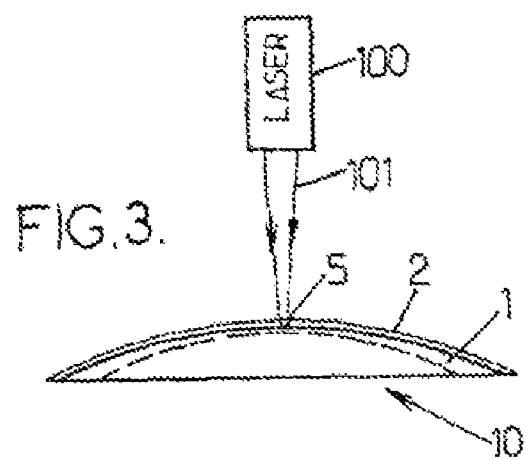
FIG. 3 shows the irradiation step of a method according to the invention.

FIG. 3 shows a preferred embodiment of the invention, which does not require the use of a mask for irradiation. The lens blank 10 can be one of the first or second configurations described above. Irradiation is carried out using a laser 100 producing a light beam 101, for example ultraviolet light. The blank 10 is placed in front of the beam 101. The distance between the laser 100 and the blank 10 is adjusted so that the active material 2 is located at a point of convergence of the beam 101. The beam 101 is moved parallel to the surface of the blank 10 to irradiate different portions of the active material 2 during successive exposures. An inscription of the optical function is thereby obtained, with a high resolution parallel to the blank surface. When the blank 10 comprises a coating 3, this one must be transparent to the beam 101.

The laser beam drive and positioning mechanisms during the inscription of the optical function may be of the type of those conventionally employed in optical compact disc etching machines. Using a computer file describing the quantification of the optical function to be provided, these mechanisms and the laser energy supply are controlled to carry out the desired modulation of the optical property of the active material between different pixels.

When the active material 2 is initially distributed in a continuous layer in the blank 10, as shown in FIG. 2*a*, the shape of the portions of the active material 2 which corresponds to different pixels is determined during the irradiation. If the irradiation is carried out through a mask, the pixels reproduce the motif of the mask. If the irradiation is carried out using a focused beam, the pixels correspond to the section of the beam in the layer of active material during successive exposures.

Figure 4A:
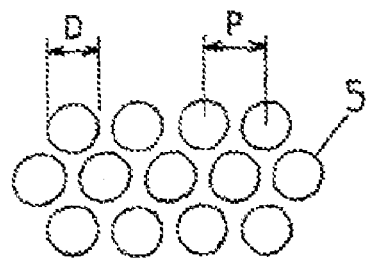
FIGS. 4a and 4b show two examples of distributions of portions of active material for optical components respectively according to FIGS. 2a and 2b.

FIG. 4*a* shows one possible distribution of the pixels for a blank 10 having the configuration shown in FIG. 2*a*. This distribution corresponds to a mesh by substantially circular pixels 5. p is the distance between 2 neighboring pixels, and corresponds to the elementary translation distance of the beam 101 when irradiation is carried out according to FIG. 3. D is the diameter of each pixel 5, and substantially corresponds to the diameter of the laser beam 101 at the level of the active material 2.

When the active material 2 is initially distributed in separate portions of the blank 10, as shown in FIG. 2*b*, the irradiation conditions are adjusted so that each portion 4 of active material 2 is exposed to the radiation under same conditions. The modulation of the optical property is then based on the distribution and the shape of the portions as they exist before irradiation. According to FIG. 4*b*, the portions 4 may each have a hexagonal shape of width D and two neighboring portions are separated by a wall of thickness d. The mesh pitch p is then equal to the sum of D and d.

In general, the pitch p is preferably between 5 µm and 100 µm. The lens accordingly has a uniform visual appearance devoid of iridescence. As an example, D may be equal to 20 µm and, for an implementation with initially separate portions of active material, d may be equal to 0.2 µm. The surface of the blank 10 then comprises a very large number of portions of the active material 2 forming pixels, in each of which the optical function is adjusted. As an example, more than one million pixels can be used.

Figure 4B:
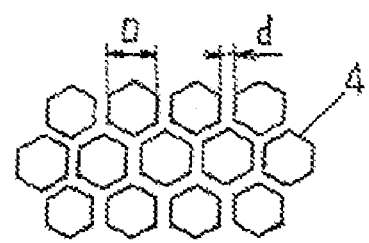

The mesh of the surface of the optical component by pixels can be of any shape whatever. In particular, the irradiated portions of the active material may be distributed in the component in a hexagonal mesh. Such a mesh allows for a high coverage rate of the surface of the optical component for numerous shapes of portions of active material. In particular, a hexagonal mesh is appropriate when the pixels are circular (FIG. 4*a*) or hexagonal (FIG. 4*b*).

In certain cases, it may be advantageous to distribute the pixels in an irregular mesh. Undesirable diffraction effects can thereby be eliminated. Also in certain cases and according to the needs of the invention, the pixels may be square or rectangular. The various shapes of pixels may also be combined.

The active material 2 may comprise a photoinitiator and/or a photopolymer. The photoinitiator and/or the photopolymer is sensitive to irradiation when this latter is carried out in appropriate conditions.

Documents EP 1 225 458 and U.S. Pat. No. 6,309,803 describe an active material sensitive to ultraviolet light of wavelength 365 nm (nanometers). Such active material can polymerize in two different phases, which are selected by the polymerization conditions applied to the optical component. The first phase corresponds to an organic polymerization network. It is formed when the active material is irradiated. The second phase corresponds to a mineral polymerization lattice and is formed when the active material is heated. The refractive index of the first phase is lower than that of the second phase.

Such active material 2 can be deposited on the substrate 1 by dipping the substrate 1 in a solution of precursors. Such deposition process is commonly referred to as "dip-coating". The solution comprises two precursors capable of together forming an organic polymerization lattice or a mineral polymerization lattice. The two precursors are 3(trimethoxysilyl) propyl methacrylate and the product of the reaction between zirconium n-propoxide and methacrylic acid. Irgacure 1800, commercially available from supplier CIBA for example, is further added to the precursor solution. After dipping the substrate 1 in the precursor solution, the substrate 1 is heated to a temperature equal to 60° C. or higher for about 30 minutes. A dried layer of active material 2 is thereby obtained on the substrate 1.

When a portion of the active material 2 thus obtained is irradiated with ultraviolet light of wavelength 365 nm, the organic polymerization lattice is formed, with a density that depends on the irradiation time and intensity. The substrate 1 is then heated to a temperature equal to 100° C. or higher for 20 to 45 minutes. The mineral polymerization lattice is then formed. In the portions of active material 2 which have not been previously irradiated, it creates a pure phase having a high refractive index. In the portions of active material 2 which have been previously irradiated, the mineral polymerization lattice is formed from quantities of precursors which have not been consumed by the organic polymerization. Intermediate refractive index values between the extreme values corresponding to the pure mineral lattice and the pure organic lattice are thereby obtained in the irradiated portions.

On completion of the polymerization heating according to the mineral lattice, the two precursors are fully consumed. The active material 2 is then insensitive to another irradiation by ultraviolet light at the wavelength of 365 nm.

In a particular embodiment of the invention, the irradiation is controlled so that the modulation of the optical property exhibits jumps between certain adjacent portions of the active material. FIG. 5a shows an example of such variations for an active material 2 with modifiable refringence. The distribution of the refractive index only depends on the distance r between a point of the layer of active material 2 and the center of the blank 10. The distance r is plotted on the x-axis and the value of the refractive index n is plotted on the y-axis. The blank 10 is divided into concentric rings $Z_1$-$Z_4$. The refractive index n varies progressively (continuously or by elementary jumps corresponding to the resolution of the index of the inscription system) within each of the rings $Z_1$-$Z_4$ between a minimum value, denoted $n_{MIN}$ and a maximum value, denoted $n_{MAX}$. At the borderline between two successive rings, the refractive index jumps from the value $n_{MAX}$ to the value $n_{MIN}$. The optical component thereby obtained has a divergent Fresnel lens function, while having a uniform thickness. A myopia corrective lens can thereby be obtained, which has an optical strength higher than those of lenses prepared according to be invention with a continuous variation of the refractive index over the entire surface of the blank.

Figure 5B:
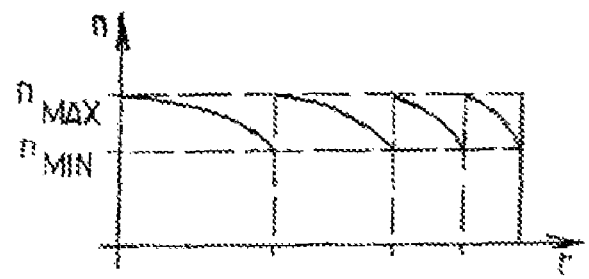
FIGS. 5a and 5b are two diagrams of variation of an optical parameter for ophthalmic lenses produced according to the invention.
Figure 5A:
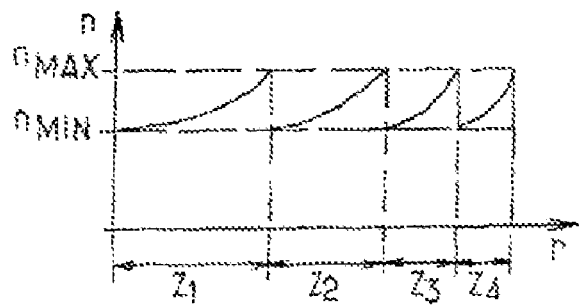

FIG. 5b corresponds to FIG. 5a for a hypermetropia corrective lens. The optical function obtained is that of a convergent Fresnel lens.

In certain particular embodiments of the invention the optical component incorporates a plurality of active materials selected so that one respective optical property of each active material can be modified selectively by irradiating the optical component. Each active material is distributed parallel to the component surface. A distinct optical function can then be inscribed in the optical component for each active material, by irradiating the component under appropriate conditions corresponding to each of the active materials. The overall optical function of the optical component thereby produced corresponds to the superimposition of the optical functions inscribed using each of the active materials. When the inscribed optical functions are of a cumulable type, the overall optical function may have a particularly high amplitude. As an example, if the inscription of each active material corresponds to a myopia corrective function, a lens adapted to a particularly high degree of myopia may be obtained.

Figure 6:
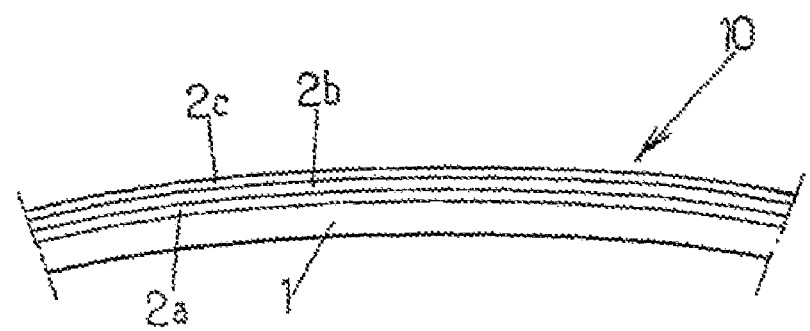
FIG. 6 shows an optical component suitable for a particular implementation of the invention.

Advantageously, the active materials are distributed in respective layers superimposed within the optical component. The optical component can then be produced simply. In particular, the active materials may be deposited successively or added onto a substrate, using an appropriate deposition method for each of them. FIG. 6 shows a lens 10 blank which comprises a substrate 1, with three different layers of active materials, referenced 2a-2c, superimposed on one face thereof.

The irradiation conditions for selectively modifying the optical property of one of the active materials can be determined by at least one photoinitiator incorporated in each active material. The various active materials thereby advantageously contain respective photoinitiators which are sensitive to radiations of distinct wavelengths.

It is understood in the context of the invention that the substrate 1 may have its own optical function. This optical function of the substrate 1 is accordingly superimposed or cumulates, with the optical function provided by the modulation of the optical property of the active material 2. For example, the substrate 1 may be of an absorbing material which imparts an antisolar function to the final lens, and the irradiation of the active material may impart an ametropia correcting function. A lens that is both antisolar and corrective is thereby obtained. The substrate 1 may also have its own correcting function, which may result in particular from a difference in thickness between the center and the periphery of the substrate 1. An additional optical function of ametropia correction provided by the modulation of the refringence of the active material 2 is then cumulated with the correction function of the substrate 1.

Finally, although the invention has been described in detail for a spectacle lens, it is also understood that it can be applied identically to other ophthalmic elements such as, for example, a helmet visor, or a mask lens. This may, for example, be a motorcyclist or aircraft pilot helmet, or a diving or mountaineering mask.

The invention claimed is:

1. A method for producing an ophthalmic lens having at least one optical function, comprising the following steps:
   a) producing an optical component incorporating a plurality of active materials formed in at least part of the component and distributed in parallel with a surface of the component, at least one of the active materials being different from others of the active materials, each active material having an irradiation-modifiable optical property and being distributed into individual, pre-defined portions prior to modulation, the neighboring portions of the active material being separated by walls; and
   b) selectively irradiating the portions along the surface of the component to obtain the optical function by modulating the respective properties of the active materials from one portion to another, the modulation based on
      i) the distribution and shape of the portions as they exist before irradiation, said portions having dimensions smaller than 1 mm, and
      ii) the corresponding differences of irradiating requirements of the respective active materials, each active material being selectively irradiation-modified with respect to the other active materials by irradiating the component under irradiating conditions which correspond to the irradiating requirements of said active material.

2. The method as claimed in claim 1, in which the portions of the active materials have dimensions of between 5 and 100 μm parallel to the component surface.

3. The method as claimed in claim 1, in which the portions of the active materials are distributed in the component with a hexagonal mesh.

4. The method as claimed in claim 1, in which at least one of the active materials has a thickness higher than 10 μm within the optical component.

5. The method as claimed in claim 1, in which certain portions of the active materials are successively irradiated.

6. The method as claimed in claim 1, in which the irradiation is carried out using a laser.

7. The method as claimed in claim 1, in which at least one of the active materials contains a photoinitiator.

8. The method as claimed in claim 1, in which at least one of the active materials contains a photopolymer.

9. The method as claimed in claim 1, in which the modifiable optical property comprises an absorption of light by at least one of the active materials.

10. The method as claimed in claim 1, in which the modifiable optical property comprises a refringence of at least one of the active materials.

11. The method as claimed in claim 10, in which the optical function comprises an ametropia correction.

12. The method as claimed in claim 11, in which the irradiation is controlled so that the modulation of the refringence of at least one of the active materials exhibits jumps between certain adjacent portions of the active materials in order to impart a Fresnel lens property to the lens.

13. The method as claimed in claim 1, in which the irradiation is controlled so that the optical property is modulated discretely according to a predefined set of values quantifying said optical property.

14. The method according to claim 13, in which the predefined set of values comprises at least ten distinct values.

15. The method as claimed in claim 1, in which the irradiation is controlled so that the modulation of the optical property exhibits jumps between certain adjacent portions of the active materials.

16. The method as claimed in claim 1, further comprising the following step:
   c) heating the optical component after irradiation, to make the active materials insensitive to another irradiation.

17. The method as claimed in claim 1, in which the active materials are distributed in respective superimposed layers within the component.

18. The method as claimed in claim 1, in which the active materials contain respective photoinitiators sensitive to radiations of distinct wavelengths.

19. An optical component for ophthalmic lens, incorporating a plurality of active materials formed in at least part of the component and distributed parallel to a surface of the component, at least one of the active materials being different from the remaining active materials, each active material
   being distributed into individual, pre-defined portions prior to modulation, the neighboring portions of the active material being separated by walls,
   having an irradiation-modifiable optical property for obtaining a modulation of said property between portions of the active material having dimensions smaller than 1 mm, the modulation of the optical property being based on the distribution and shape of the portions as they exist before irradiation,
   having an optical property selectively modifiable by irradiation and being distributed parallel to the surface of the component, and
   being selectively irradiation-modifiable with respect to the other active materials by irradiation of the component under irradiating conditions which correspond to said active material.

20. The component as claimed in claim 19, in which at least one of the active materials contains a photoinitiator.

21. The component as claimed in claim 19, in which at least one of the active materials contains a photopolymer.

22. The component as claimed in claim 19, in which at least one of the active materials has a thickness higher than 10 μm within the optical component.

23. The component as claimed in claim 19, in which the modifiable optical property comprises an absorption of light by at least one of the active materials.

24. The component as claimed in claim 19, in which the modifiable optical property comprises refringence of at least one of the active materials.

25. The component as claimed in claim 19, in which the active materials are distributed in respective layers superimposed within the component.

26. The component as claimed in claim 19, in which the active materials contain respective photoinitiators sensitive to radiations of distinct wavelengths.

* * * * *